UNITED STATES PATENT OFFICE.

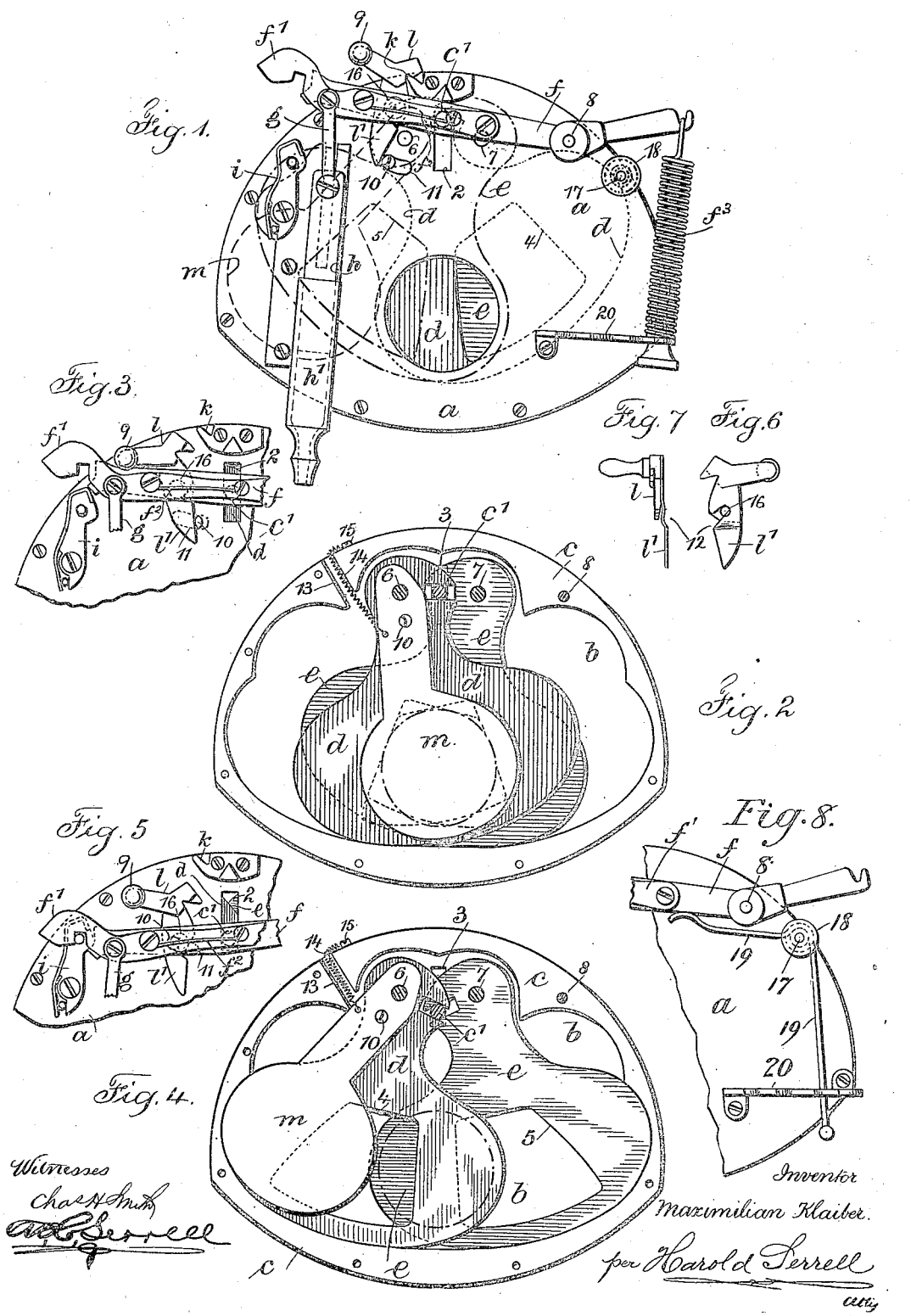

MAXIMILIAN KLAIBER, OF NEW YORK, N. Y., ASSIGNOR, BY MESNE ASSIGNMENTS, TO PROSCH PHOTOGRAPHIC SHUTTER AND OPTICAL COMPANY, A CORPORATION OF NEW YORK.

PHOTOGRAPHIC SHUTTER.

No. 834,812.     Specification of Letters Patent.     Patented Oct. 30, 1906.

Application filed September 18, 1905. Serial No. 278,852.

*To all whom it may concern:*

Be it known that I, MAXIMILIAN KLAIBER, a citizen of the United States, residing at the borough of Brooklyn, in the county of Kings, city and State of New York, have invented an Improvement in Photographic Shutters, of which the following is a specification.

My invention is an improvement upon the well-known Prosch photographic shutter covered by Letters Patent of the United States, granted to Cyrus Prosch, No. 352,098, dated November 2, 1886. These shutters have been especially adapted for time and instantaneous photography with plate-cameras, wherein the shutter could be set with or without the use of the lens-cap before withdrawing the slide of the plate-holder to expose the plate, as the passage of light through the lens with the moving shutter made no difference so long as the sensitive surface of the plate was covered by the slide. These shutters, however, have not heretofore been adapted for use with film-cameras, in which the sensitive surface is always exposed, because without the constant use of the lens-cap while setting the shutter a film would be exposed every time the shutter was set, and it is the object of my present invention to prevent these difficulties, especially in view of the fact that in the film-cameras of the present art no lens-caps are employed and no room is provided to carry the same.

In my present invention and in combination with the structure of the well-known Prosch photographic shutter I employ a pivoted manually-actuated spring-returned mask-blade independent of the shutter-blades, yet moved into position to close the lens-aperture simultaneous with the unlocking of the shutter-lever and with the initial movement of the shutter-blades and which mask-blade as soon as the shutter-blades are set and the said blade has performed its function is returned to an initial and uninfluenced position until after the working of the shutter has made the exposure and it becomes necessary to set the shutter again previous to another exposure.

In the drawings, Figure 1 is an elevation of the shutter in its locked position after an exposure has been made. Fig. 2 shows the frame, shutter-blades, and mask-blade with the operating mechanism removed in the position where the mask-blade closes the lens-aperture, the shutter-blades being in their complementary position. Fig. 3 shows sufficient of the shutter-operating mechanism to indicate its position complementary to the devices shown in Fig. 2. Fig. 4 is a view similar to Fig. 2, but in the position with the shutter-blades closed preparatory to making the exposure and the mask-blade returned to its initial position, while Fig. 5 shows so much of the shutter-operating mechanism as indicates the complementary position thereof to the position of the devices shown in Fig. 4. Fig. 6 represents by a side elevation the locking-hook and its spring foot-blade. Fig. 7 is an edge view of the same, and Fig. 8 illustrates the position of a well-known form of spring employed by me and which spring is an alternate with the form shown in Fig. 1.

The parts illustrated and which are combined to form the well-known Prosch photographic shutter may be described as follows: The casing of the shutter is of approximately curvilinear triangular form, comprising a front plate $a$, a back plate $b$, and intermediate frame $c$, secured together, the intermediate frame being of such thickness as to provide an internal space for the shutter-blades $d$ and $e$. The front and back plates of the casing are provided with coinciding vertical slots, the slot 2 in the front plate and the slot 3 in the back plate. The shutter-blades are provided with apertures 4 5 of trapezoidal form, and they are slotted at opposite points in their adjacent edges and in proximity to their pivots 6 7, by which they are mounted in the front and back plates of the shutter.

The lever $f$ is pivoted at 8 to the front plate, and it is provided with the usual auxiliary lever $f'$, spring-held in its relation to the lever $f$ by a spring $f^2$, and $g$ is a link connecting the auxiliary lever $f'$ to the piston $h$ of the pneumatic release, which is movable in the case $h'$.

$i$ represents the usual catch of this well-known form of shutter engaging the notch of the auxiliary lever $f'$. $k$ is also a catch of usual form in this shutter adapted to engage the hook $l$, which is pivotally connected by a screw 16 to the lever $f$ and is the hook locking the position of the shutter-blades at the completion of their movement in exposing the plate or film. On this hook $l$ is the knob 9, employed to unlock the hook $l$ from the catch $k$, the lever $f$ being provided, as usual, with a pin $c'$, moving in the coinciding vertical slots 2 3 of the shutter-plates, and which pin is received in the slots of the shutter-blades and is employed to actuate the same.

The special features of my invention relate to and consist of the mask-blade $m$, pivotally mounted within the shutter-case on the pivot 6 of the blade $d$ and overlying the blade $d$, preferably underlying the front plate of the shutter. This blade $m$ is provided with a pin 10, passing through a slot 11 in the front plate $a$ and projecting slightly beyond the surface of the said front plate. Coacting therewith the locking-hook $l$, pivotally mounted on the lever $f$, is provided with a spring foot-blade $l'$, having a straight edge adapted to come at one side of and bear upon the pin 10, and this spring foot-blade $l'$ is so constructed as to provide a shallow slideway or groove 12 of appreciable extent at and back from the straight edge thereof, which bears upon the pin 10. This pin 10 is preferably beveled on the outer end, as shown.

The internal frame $c$ is provided with a slot 13, through which passes a spring 14, preferably of coiled or helical form, with one end connected to one edge of the mask-blade and with the other end connected to a device 15, such as a screw, secured to the outer surface of the said frame $c$ and applying a tension to the mask-blade to hold the same in an initial position, such as is shown in Figs. 1 and 4. $f^3$ is a spring employed in this form of shutter connected at one end to an extension of the lever $f$ and at its lower end to a plate 20, connected to the front plate of the shutter-case and adapted to supply the power required to move the shutter-blades when the lever is released.

The operation of this device is as follows: Referring first to Fig. 1, which, as hereinbefore described, shows the parts in their locked position after the shutter has been moved to expose the plate or film. The knob 9 is grasped by the fingers and pressed down to remove the hook $l$ from the catch $k$, the turning movement being on the pivot of the hook $l$ to the lever $f$. The straight edge of the foot-blade $l'$ is in engagement with the pin 10 of the mask-blade $m$. This movement at once swings the mask-blade from its initial position toward the aperture in the shutter, and the shutter-blades do not commence a movement until after the hook $l$ is entirely released from the catch $k$, at which moment the mask-blade $m$ has been given an appreciable amount of movement. In this movement Figs. 2 and 3 show the position of the mask-blade and shutter-blades, as well as the operating mechanism, at the moment when the mask-blade has entirely covered over the aperture in the shutter. As this is the intermediate position of the shutter-blades $d$ $e$, it will be noticed from Fig. 2 that the trapezoidal openings of the shutter coincide back of the mask-blade, the dotted circle representing the aperture of the shutter with which said trapezoidal openings also coincide for full aperture and over which the mask-blade fully extends, said mask-blade thus shutting out the light from passing through the shutter. Fig. 5 shows the locked position of the operating mechanism, in which the auxiliary lever $f'$ engages the catch $i$, and it will therefore be appreciated by viewing Fig. 3 that there is still a further movement to be given these parts, and in this movement the mask-blade $d$ is maintained in its position, the straight edge of the foot-blade $l'$ holding the same in said position while said straight edge slides down over the projecting edge of the pin 10. At substantially the moment when the locked position, Fig. 5, is effected the shutter-blades are brought into the position, Fig. 4, in which their crossing parts shut off the shutter-aperture and prevent the passage of the light, and simultaneously with this position the slide-groove 12 of the foot-blade $l'$ has been brought down to coincidence with the pin 10 of the mask-blade, and in which position said pin 10 is free to be moved into the slide-groove by the contractile action of the tension-spring 14, drawing the mask-blade $m$ from the position Fig. 2 to the position Fig. 4, said mask-blade remaining inactive in this position until after the shutter-blades have been moved by the pneumatic release and the lever device in exposing the plate and returning to the position Fig. 1. During the moment of exposure of the plate or film the foot-blade $l'$, which, as will be seen from Fig. 5, is over the pin 10, yields with the upward movement, and as the hook $l$, which is spring-actuated, as is common in these shutters, engages the catch $k$ the straight edge of the foot-blade is brought again into position and contact with the edge of the pin 10 to repeat the movements hereinbefore described.

I have also shown in Figs. 1 and 8 as secured to the frame $c$ and projecting through a hole in the front plate $a$ the post 17, usually employed in this style of shutter, and a nut 18, screwing upon the threaded end of the said post, and associated with which is the usual lever-spring 19, (shown in Fig. 8,) one end of which bears against the under side of the lever $f$, and the other end engages the notched plate 20. The springs $f^3$ and 19 are substitute devices and equivalents for the operation of the shutter-blades, except that the spring $f^3$ is more powerful and of quicker action and is most usually employed in the most rapid instantaneous shutter-work, while the spring 19 is employed in ordinary instantaneous exposures. These springs are used on the same shutter as alternates for one another, according to the character of the work to be performed.

This device is simple in construction, is positive in its movements, and of so few parts that it can readily be made in the smallest sizes of these shutters for small film-cameras, as well as in larger sizes, if desired.

I claim as my invention—

1. In a photographic shutter, the combination with the case, a pair of apertured pivoted blades and a pivoted lever and coacting operating devices, of an independent pivoted mask-blade, means for swinging the same simultaneously with the movement of the aforesaid blades, and means for returning the same to an initial position.

2. In a photographic shutter, the combination with the case, a pair of apertured pivoted blades, an exterior pivoted lever and pneumatic release and a coacting spring-held auxiliary lever, of an independent pivoted mask-blade, means for swinging the same in advance of and simultaneously with the movement of the aforesaid blades and by the same devices, and means for returning the same to an initial position.

3. In a photographic shutter, the combination with the case, a pair of apertured pivoted blades, a pivoted lever and coacting operating devices, of an independent mask-blade within the case pivotally mounted on the pivot of one of the aforesaid shutter-blades, a pin connected thereto and projecting through a slot of the case, means for swinging the said mask-blade simultaneously with the movement of the aforesaid blades, and means for returning the same to an initial position.

4. In a photographic shutter, the combination with the case, a pair of apertured pivoted blades, a pivoted lever and coacting operating devices, of an independent mask-blade within the case pivotally mounted on the pivot of one of the aforesaid shutter-blades, a pin connected thereto and projecting through a slot of the case, means for swinging the said mask-blade in advance of and simultaneously with the movement of the aforesaid blades and by the same devices, and means for returning the same to an initial position.

5. In a photographic shutter, the combination with the case, a pair of apertured pivoted blades, a pivoted lever and coacting operating devices, of an independent device actuated by the movement of the shutter devices and acting in advance of the blades and simultaneously with the same to close the lens-aperture and exclude light while the shutter-blades are being crossed to a locked position, and means for returning the same to an initial position.

6. In a photographic shutter, the combination with the case, a pair of apertured pivoted blades, a pivoted lever and coacting operating devices, of an independent mask-blade within the case, a pin connected thereto and projecting through a slot in the case, a latch device and a yielding foot-blade formed therewith and adapted to bear against said pin and by means of which the said mask-blade is swung on its pivot simultaneously with the movement of the shutter devices.

7. In a photographic shutter, the combination with the case, a pair of apertured pivoted blades, a pivoted lever and coacting operating devices, of an independent mask-blade within the case pivotally mounted on the pivot of one of the aforesaid shutter-blades, a pin connected thereto and projecting through a slot in the case, a latch device, and a yielding foot-blade formed therewith and adapted to bear against said pin and by means of which the said mask-blade is swung on its pivot simultaneously with the movement of the shutter devices.

8. In a photographic shutter, the combination with the case, a pair of apertured pivoted blades, a pivoted lever and coacting operating devices, of an independent mask-plate within the case, a pin connected thereto and projecting through a slot in the case, a latch device, and a yielding foot-blade formed therewith and adapted to bear against said pin and by means of which the said mask-blade is swung on its pivot simultaneously with the movement of the shutter devices, said latch device and its yielding foot-blade having a slide-groove for the passage of the pin of the mask-blade in its return movement.

9. In a photographic shutter, the combination with the crossing shutter-blades having independent pivots and apertures of trapezoidal form, of a mask-blade overlying one of said shutter-blades and pivotally mounted on the pivot of said blade, a helical spring connected to one edge of said mask-blade and at its other end connected to the frame of the shutter and adapted to hold the mask-blade in an initial position and return the same thereto, and means coacting with the shutter-operating mechanism for moving the mask-blade against the tension of the spring to momentarily cover the light-aperture of the shutter.

10. In a photographic shutter, the combination with the crossing shutter-blades having independent pivots and apertures of trapezoidal form, of a mask-blade overlying one of said shutter-blades and pivotally mounted on the pivot of said blade, a helical spring connected to one edge of said mask-blade and at its other end connected to the frame of the shutter and adapted to hold the mask-blade in an initial position and return the same thereto, a pin formed with said mask-blade and projecting through a slot of the case, and a pivoted swinging hook device and integral foot-blade adapted with the movement of the shutter devices to bear against said pin and swing the mask-blade against the tension of the spring to a position where it is momentarily held in closing the aperture of the shutter.

Signed by me this 5th day of September, 1905.

MAXIMILIAN KLAIBER.

Witnesses:
GEO. T. PINCKNEY,
S. T. HAVILAND.